(12) United States Patent
Waltz et al.

(10) Patent No.: US 7,708,606 B2
(45) Date of Patent: *May 4, 2010

(54) KNURLED INNER SLEEVE FOR A CABLE CONNECTOR

(75) Inventors: Peter Waltz, Bristol, NH (US); Peter Chan, Toronto (CA)

(73) Assignee: Burndy Technology LLC, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/380,832

(22) Filed: Mar. 3, 2009

(65) Prior Publication Data

US 2009/0197480 A1 Aug. 6, 2009

Related U.S. Application Data

(63) Continuation of application No. 12/017,736, filed on Jan. 22, 2008.

(60) Provisional application No. 60/901,771, filed on Feb. 16, 2007.

(51) Int. Cl.
*H01R 4/50* (2006.01)

(52) U.S. Cl. ..................................... 439/783; 174/74 R

(58) Field of Classification Search ................. 439/783, 439/805; 174/74 R, 84 R
See application file for complete search history.

(56) References Cited

U.S. PATENT DOCUMENTS

| | | | |
|---|---|---|---|
| 2,902,537 A | 9/1959 | Salvi | 174/79 |
| 3,384,704 A | 5/1968 | Vockroth | 174/90 |
| 3,681,512 A | 8/1972 | Werner et al. | 174/84 |
| 3,877,773 A | 4/1975 | Doty et al. | 439/406 |
| 4,453,034 A | 6/1984 | Annas et al. | 174/79 |
| 5,647,046 A | 7/1997 | Cowen et al. | 385/136 |
| 5,975,948 A | 11/1999 | Weaver | 439/578 |
| 6,015,953 A | 1/2000 | Tosaka et al. | 174/79 |
| 6,805,596 B2 | 10/2004 | Quesnel et al. | 439/877 |
| 7,019,217 B2 | 3/2006 | Bryant | 174/88 |
| 7,407,411 B2 | 8/2008 | Byrne et al. | 439/578 |
| 2004/0132366 A1 | 7/2004 | Hiel et al. | 442/43 |
| 2006/0084327 A1 | 4/2006 | Chadbourne | 439/784 |
| 2006/0252309 A1 | 11/2006 | Kodama et al. | 439/578 |

OTHER PUBLICATIONS

Burndy Master Catalog, p. E-39.

*Primary Examiner*—Briggitte R Hammond
(74) *Attorney, Agent, or Firm*—Harrington & Smith

(57) ABSTRACT

Disclosed herein is an electrical connector assembly. The electrical connector assembly includes a connector member, a wedge sleeve, a wedge, and outer sleeve, and an inner sleeve. The connector member has a first end section and a second end section. The wedge sleeve has a general tube shape. The wedge sleeve includes a front end and a rear end. The front end of the wedge sleeve is mounted onto the second end section of the connector member. The wedge is configured to be located between the wedge sleeve and a core member of a cable. The outer sleeve is located around the wedge sleeve. The outer sleeve has a front end which is attached onto the connector member. The inner sleeve is configured to be fitted between the outer sleeve and the cable. An outer surface of the inner sleeve comprises a first knurled area.

25 Claims, 10 Drawing Sheets

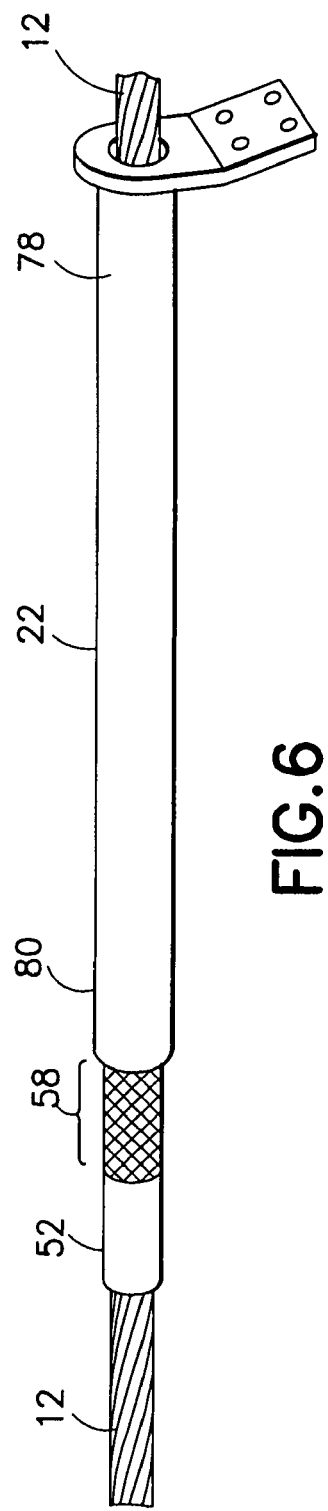
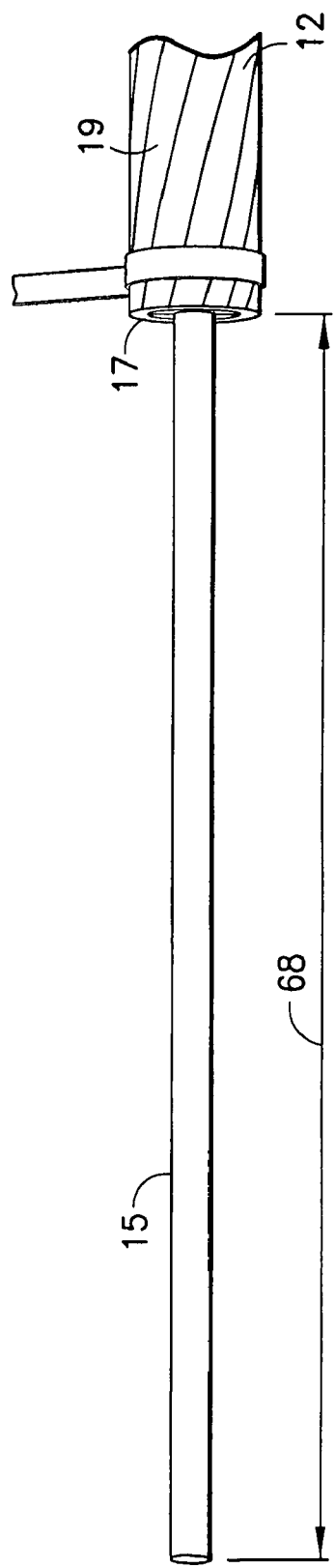

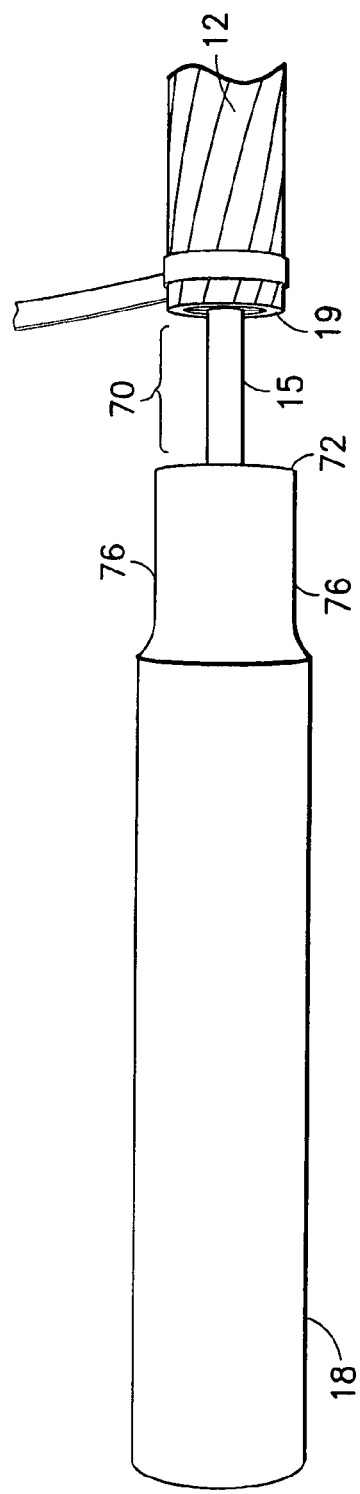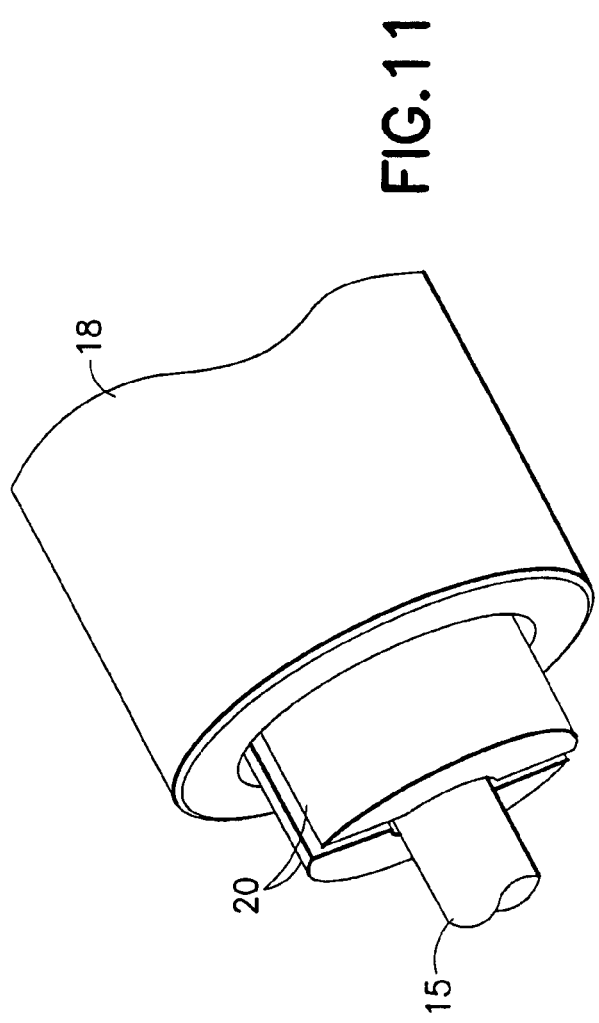

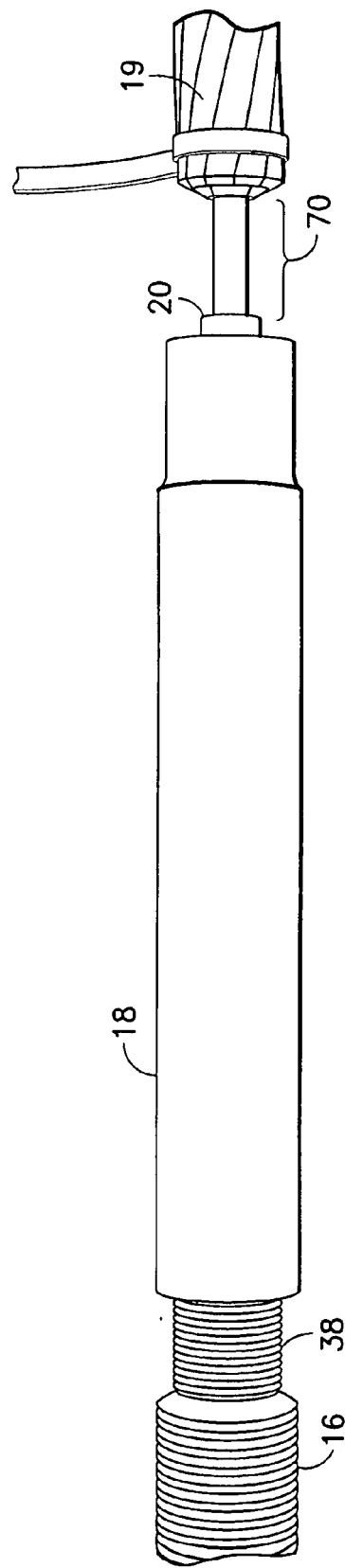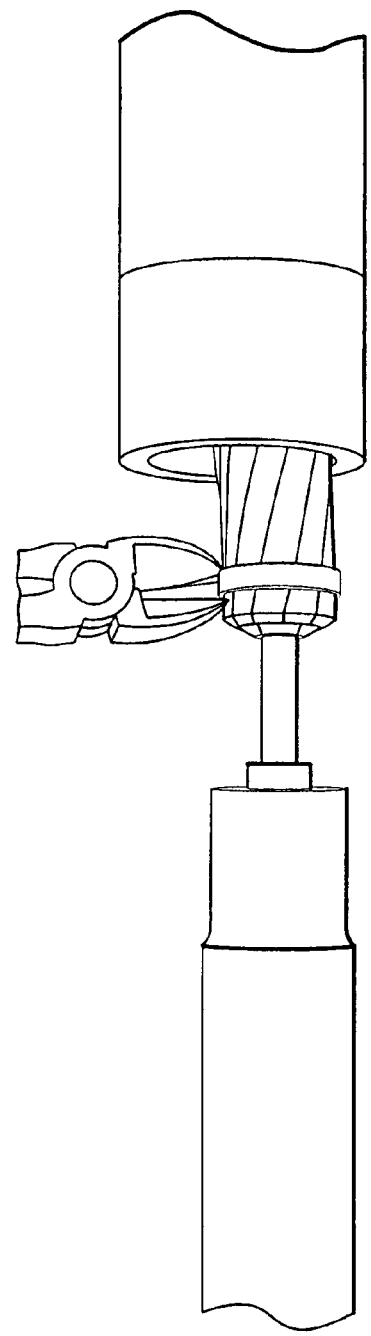

ND STATES PATENT

KNURLED INNER SLEEVE FOR A CABLE CONNECTOR

CROSS REFERENCE TO RELATED APPLICATION

This is a continuation patent application of U.S. patent application Ser. No. 12/017,736 filed on Jan. 22, 2008. This application also claims priority under 35 U.S.C. §119(e) to U.S. provisional patent application No. 60/901,771 filed Feb. 16, 2007 which is hereby incorporated by reference in its entirety.

BACKGROUND OF THE INVENTION

1. Field of the Invention

The invention relates to an electrical cable connector and, more particularly, to an inner sleeve for an electrical cable connector for power lines.

2. Brief Description of Prior Developments

Electrical connectors for connecting power lines are designed to provide reliable connections in power distribution networks. As electric utility operating environments become more severe and demanding, there is an increasing demand to improve the efficiency of the electrical connectors. One method to improve the efficiency of an electrical connector is to reduce the electrical resistance between mating connector components. Improved electrical connector efficiency leads to reduced costs and improved power transmission capabilities.

Accordingly, there is a need for an electrical connector having reduced electrical contact resistance.

SUMMARY OF THE INVENTION

In accordance with one aspect of the invention, an electrical connector assembly is disclosed. The electrical connector assembly includes a connector member, a wedge sleeve, a wedge, and outer sleeve, and an inner sleeve. The connector member has a first end section and a second end section. The wedge sleeve has a general tube shape. The wedge sleeve includes a front end and a rear end. The front end of the wedge sleeve is mounted onto the second end section of the connector member. The wedge is configured to be located between the wedge sleeve and a core member of a cable. The outer sleeve is located around the wedge sleeve. The outer sleeve has a front end which is attached onto the connector member. The inner sleeve is configured to be fitted between the outer sleeve and the cable. An outer surface of the inner sleeve comprises a first knurled area.

In accordance with another aspect of the invention, a dead end electrical connector assembly is disclosed. The dead end electrical connector assembly includes a dead end connector member, a wedge sleeve, an outer sleeve, and an inner sleeve. The dead end connector member has a first end section and a second end section. The second end section includes a threaded section. The first end section is adapted to be connected to another member. The wedge sleeve has a general tube shape. The wedge sleeve includes a front end and a rear end. The front end of the wedge sleeve includes a threaded section engaged with the threaded section of the dead end connector member. The outer sleeve is located around the wedge sleeve. The outer sleeve has a front end which is connected to the dead end connector member. The inner sleeve is adjacent the wedge sleeve. The inner sleeve includes raised ridges on an outer surface of the inner sleeve. The raised ridges are in contact with an inner surface of the outer sleeve.

In accordance with another aspect of the invention, a splice electrical connector assembly is disclosed. The splice electrical connector assembly includes a middle connector, a first section, a second section, at least one outer sleeve, and at least one inner sleeve. The middle connector member has a first end with a first threaded section and an opposite second end with a second threaded section. The first section includes a first wedge sleeve and a first wedge. The first wedge sleeve has a general tube shape. The first wedge sleeve includes a first end with a threaded section engaged with the first threaded section of the middle connector member. The first wedge is configured to be disposed between the first wedge sleeve and a core member of a first cable. The second section includes a second wedge sleeve and a second wedge. The second wedge sleeve has a general tube shape. The second wedge sleeve includes a first end with a threaded section engaged with the second threaded section of the middle connector member. The second wedge is configured to be disposed between the second wedge sleeve and a core member of a second cable. The at least one outer sleeve is located around the first and/or the second wedge sleeve. The at least one outer sleeve is connected to the middle connector member. The at least one inner sleeve is configured to be fitted between the at least one outer sleeve and the first and/or the second cable. An outer surface of the at least one inner sleeve comprises a first knurled area.

BRIEF DESCRIPTION OF THE DRAWINGS

The foregoing aspects and other features of the invention are explained in the following description, taken in connection with the accompanying drawings, wherein:

FIG. 6 is a side view of an outer sleeve and an inner sleeve of the connector of FIG. 1 located onto the cable during assembly;

FIG. 7 is a side view or the cable shown in FIG. 2 with the wire conductors removed from a length at the end of the core;

FIG. 10 is a side view showing the collet housing and wedges initially mounted onto the core of the cable;

FIG. 11 is a perspective view of an end of the collet housing, wedges and core shown in FIG. 10;

FIG. 14 is a side view of the final installed position of the collet housing, wedges and dead end connector member to the cable;

FIG. 15 is a side view of the temporary cable tie being removed and the outer sleeve being located to be positioned onto the collet housing and the dead end connector member.

DETAILED DESCRIPTION OF THE PREFERRED EMBODIMENTS

Figure 1:
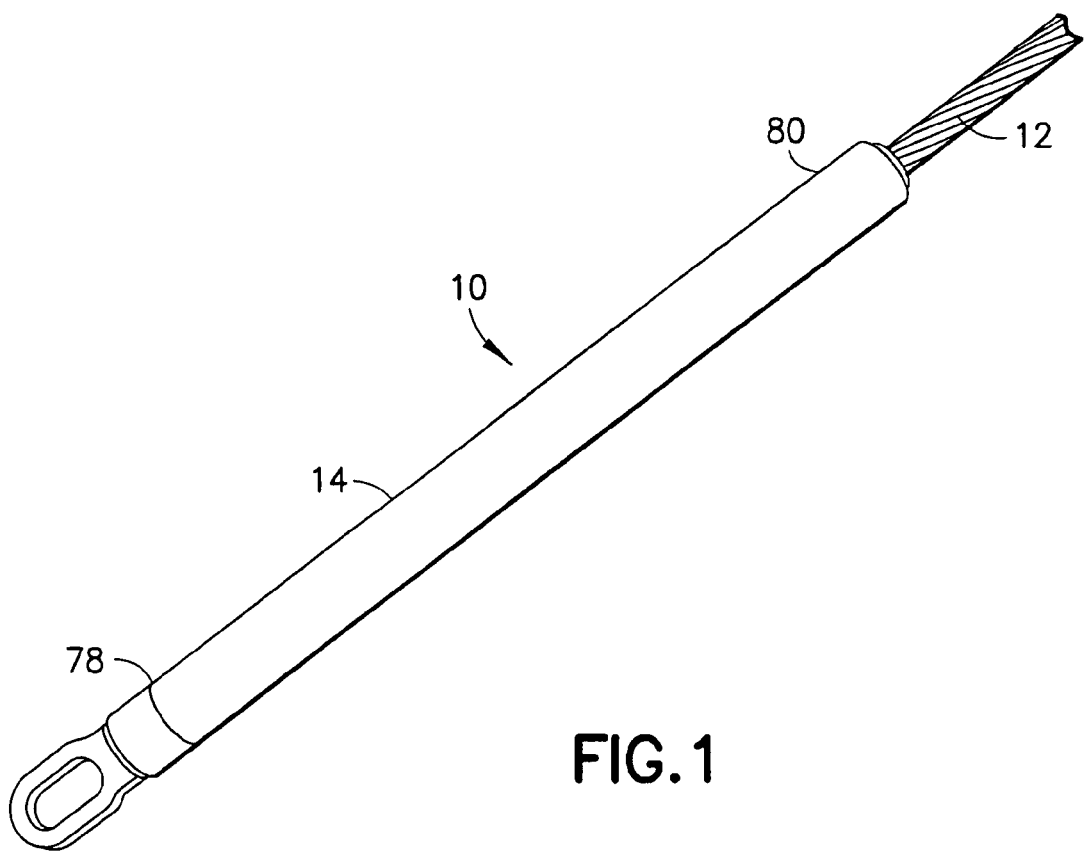
FIG. 1 is a perspective view of a connector and cable assembly.

Referring to FIG. 1, there is shown a perspective view of an electrical cable connector assembly 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 2:
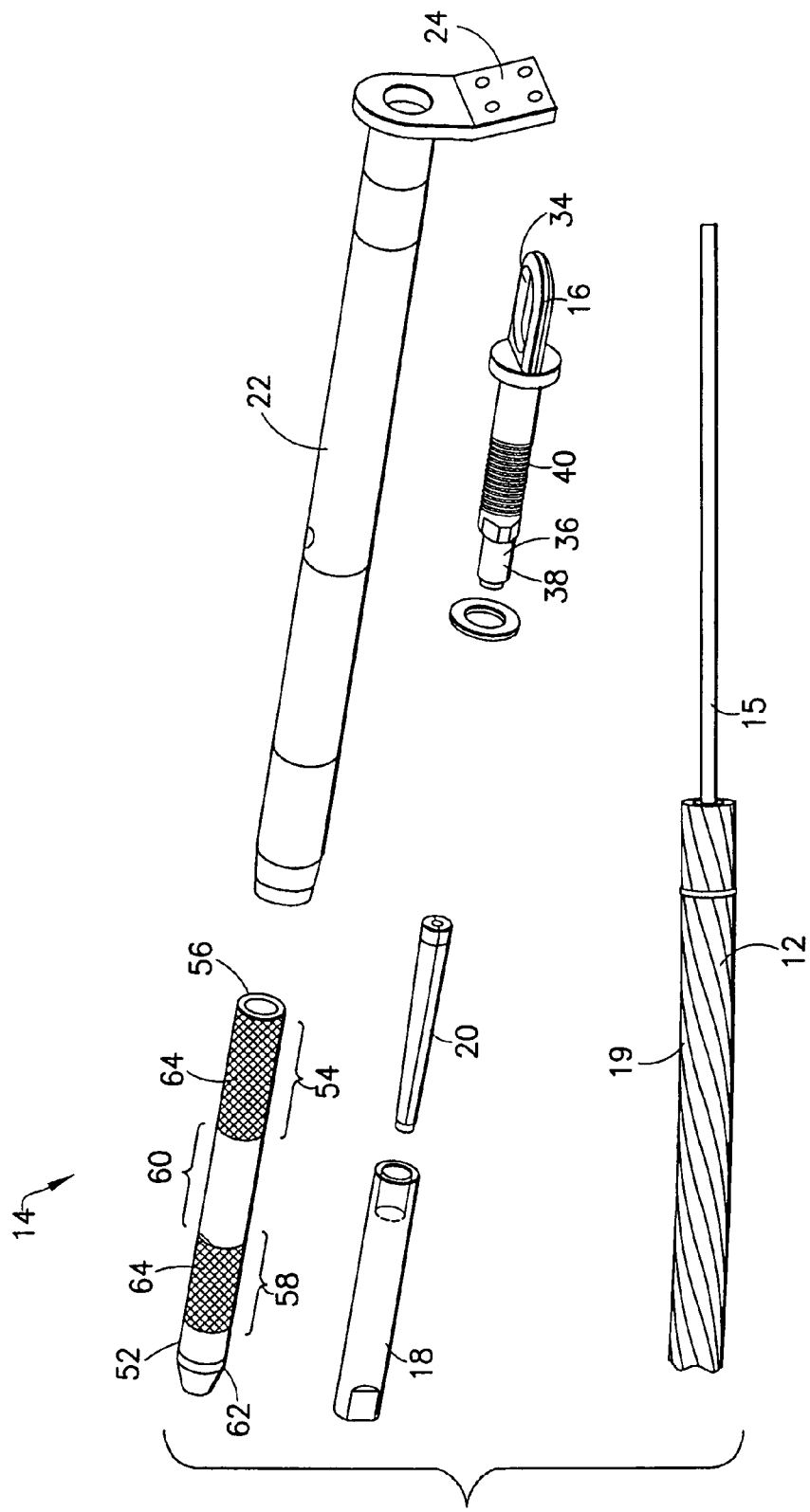
FIG. 2 is an exploded view of the connector and cable assembly shown in FIG. 1.
Figure 3:
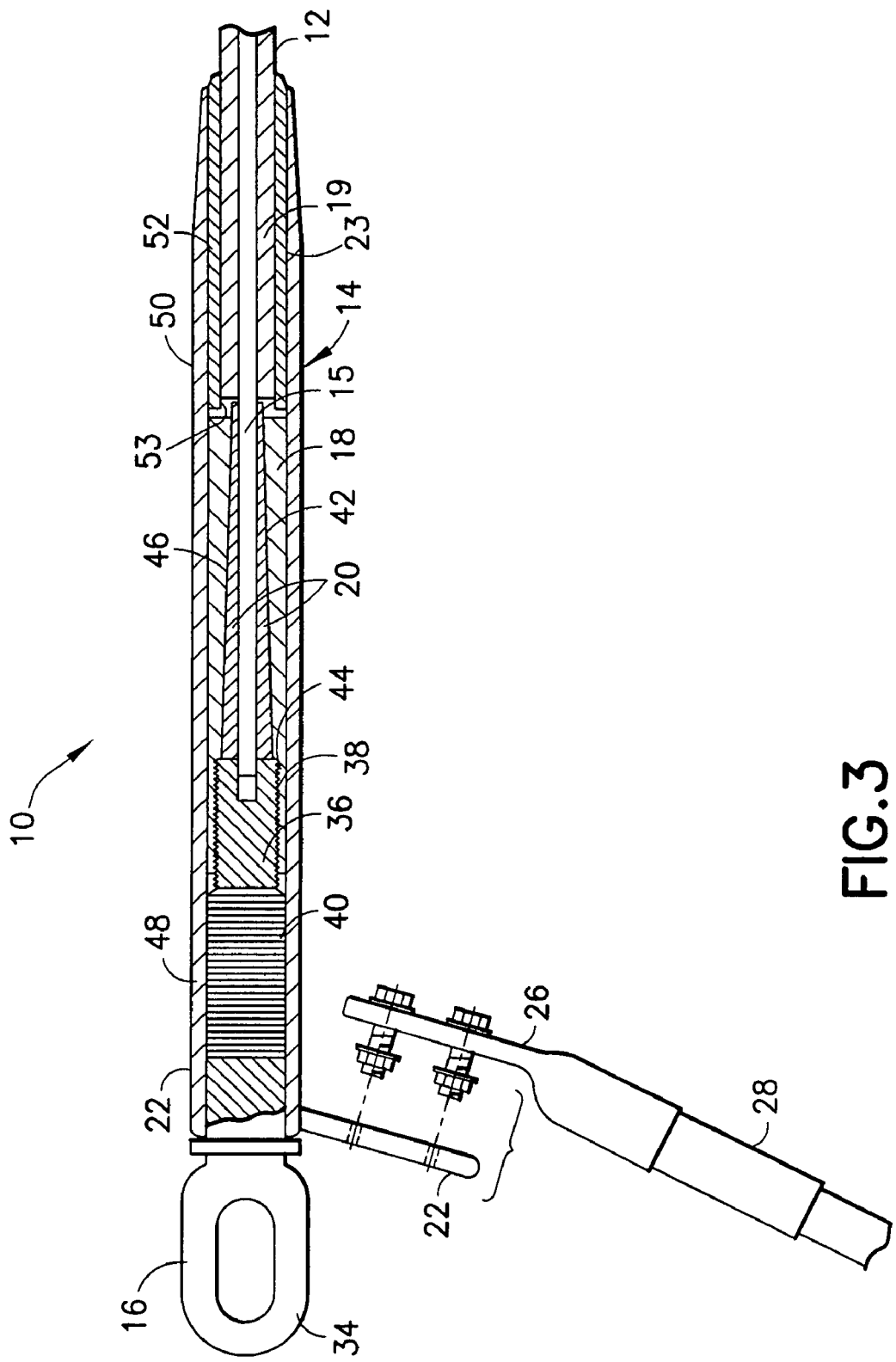
FIG. 3 is a cross sectional view of the connector and cable assembly shown in FIG. 1.

The assembly 10 includes a cable 12 and an electrical connector 14. The connector 14 is a dead end connector adapted to mechanically connect an end of the cable 12 to another member, such as a transmission tower. Referring also to FIGS. 2 and 3, the connector 14 generally comprises a dead end connector member 16, a collet housing 18, wedges 20 and an outer sleeve 22. As shown in FIGS. 2 and 3 the outer sleeve 22 may comprise an integral tap or connection plate 24 for electrically connecting a connector 26 of another cable assembly 28 to the assembly 10. However, as seen in FIG. 1, the connection plate 24 need not be provided.

The cable 12 generally comprises a core 15 around which one or more layers (or strands) 17 of conductor wires 19, such as made of aluminum, are wrapped. The disclosed connector 14 may be used with any suitable power line, such as composite core or steel core power transmission lines for example.

The dead end connector member 16 comprises a one-piece metal member, such as steel or aluminum, having an eyelet 34 at a first end section and an opposite second end section 36 with a threaded section 38. The dead end connector member 16 also comprises a ridge section 40. The eyelet 34 is adapted to be connected to another member, such as a transmission tower. The collet housing (or wedge sleeve) 18 is preferably a one piece metal member, such as a steel conduit. The collet housing 18 has a general tube shape with an inner channel 42 having a threaded section 44 at a first end and a tapered section 46 extending away from the threaded section 44.

The wedges 20 comprise two wedges each having a general C shaped cross-section. However, in alternate embodiments, more than two wedges could be provided. As another alternate embodiment, only a single wedge might be provided which has slots forming multiple deflectable arms. The outer sides of the wedges are smooth to be able to slide against the inside surface of the tapered section 46. The inner sides of the wedges are adapted to grip onto the exterior surface of the core 15 of the cable 12. The wedges 20 may be adapted to contact each other when fully inserted into the collet housing 18. The wedges 20 have a suitable length, such as about 11 inches in one example, to provide a large contact area with the core 15 to provide a good friction grip which will not come loose at high tensile force, such as about 21 tons.

The outer sleeve 22 is made of electrically conductive metal, such as aluminum. The outer sleeve 22 has a general tube shape. The outer sleeve 22 is located around the collet housing 18. A first end 48 of the outer sleeve 22 is located over the ridge section 40 of the dead end connector member 16 and crimped or compressed onto the ridge section 40 to form a primarily mechanical connection between the outer sleeve 22 and the dead end connector member 16. A second end 50 of the outer sleeve 22 is located over the wires 19 of the cable 12 and crimped or compressed onto the wires 19 to form a mechanical and electrical connection with the wires 19. An inner sleeve 52, which may be a one-piece member fabricated from a conductive material such as aluminum for example, is disposed between the outer sleeve 22 and the cable 12.

The inner sleeve 52 (best illustrated in FIGS. 4 and 5) is a generally tubular component that makes up the difference between the conductor cable 12 and the standard diameter outer sleeve 22 of the connector 14 within a particular "family" or range of conductor sizes. The inner sleeve 52 comprises a hole 53 extending along an entire length of the inner sleeve 52 which is sized and shaped to accommodate the cable 12 therein. The inner sleeve 52 comprises a first knurl area or zone 54 proximate a first end 56 of the inner sleeve 52. The inner sleeve 52 also comprises a second knurl zone 58 between a middle portion 60 of the inner sleeve 52 and a second end 62 of the inner sleeve 52. The knurl zones 54, 58 comprise a pattern of indentations 64 along outer surfaces of the inner sleeve 52. The knurl zones 54, 58 may be straight lines or diagonal cross-hatch indentations. Additionally, the knurl zones 54, 58 may be formed by a process which forces the areas between the indentations 64 outward in a radial manner from the axis of the knurled part, which enlarges the surface area.

Knurl zones are generally specified on many machine parts and are used for finger grips on cylindrical nuts and knobs, for holding an insert in a plastic or molded material, or for an interference fit within a mating piece. The disclosed inner sleeve 52 may provide an interference fit between the roughly textured knurled inner sleeve 52 and the outer sleeve 22. An inner surface 23 of the outer sleeve 22 may comprise a smoother surface than the roughly textured surface (or knurl zone 54, 58) of the inner sleeve 52. One advantage to the disclosed knurled inner sleeve 52 is a reduction of electrical contact resistance between the textured inner sleeve 52 and the outer sleeve 22. The reduction in electrical contact resistance is provided as the electrical contact surfaces between inner sleeve 52 and the outer sleeve 22 is at the knurl zones 54, 58. The knurl zones 54, 58 provide for defined areas of contact between the outer surface of the inner sleeve 52 and the inner surface 23 of the outer sleeve 22. In one embodiment the electrical contact resistance of the interface between the disclosed knurled inner sleeve 52 and the outer sleeve 22 is reduced by a factor of 3, as compared to conventional tube combinations with smooth surfaces. The reduced resistance between the inner sleeve 52 and the outer sleeve 22 provides for overall improved connector 14 efficiency and reduced operating costs. The knurl displaces surface oxides, inhibitor, protective coating (wax) at points of true electrical contact. The knurl also traps pockets of inhibitor creating near water tight seals resulting in improved reliability and long term performance.

It should be noted that although the figures illustrate the inner sleeve 52 as having two knurl zones 54, 58, any number of knurl zones may be provided. For example, one continuous knurl zone could be provided, or more than two knurl zones could be provided. Additionally, it should be understood that although the knurl zones 54, 58 are described as comprising straight lines or diagonal cross-hatch indentations 64, any suitable knurl pattern forming raised ridges and/or indentations may be provided. It should also be noted that any dimensions provided in the description are for exemplary purposes only.

Figure 8:
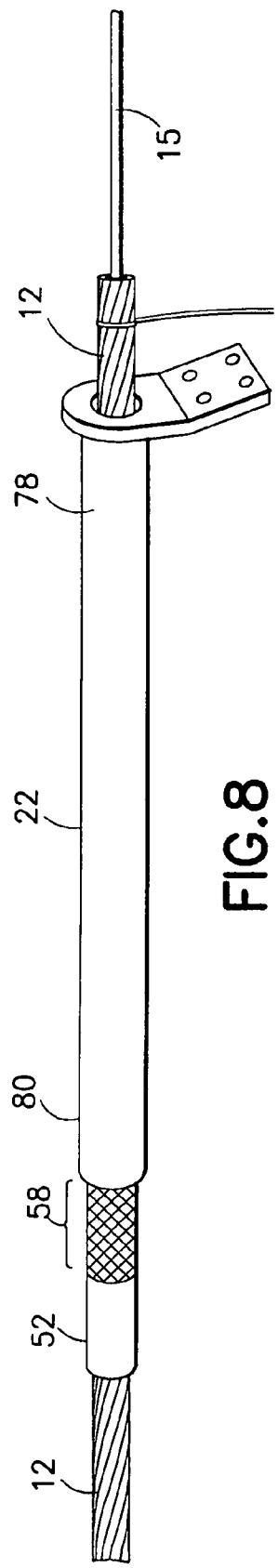
FIG. 8 is a perspective view of the cable as shown in FIG. 7 and showing the outer sleeve and inner sleeve of FIG. 6.

Referring now also to FIGS. 6-15, one method of attaching the connector 14 to the cable 12 will be described. As seen in FIG. 6, the inner sleeve 52 is installed or slid over the cable 12. The outer sleeve 22 is then a slid over the cable 12. As seen in FIG. 7, the strands 17 of the wires 19 are cut to expose a length 68 of the core 15. The length 68 may be about 12 inches for example. The strands 17 may be cut by any suitable method, such as using a pipe cutter or hacksaw for example. The installer may also install a cable tie to keep the strands together. FIG. 8 shows the cable and sleeves ready for installation with the rest of the assembly.

Figure 9:
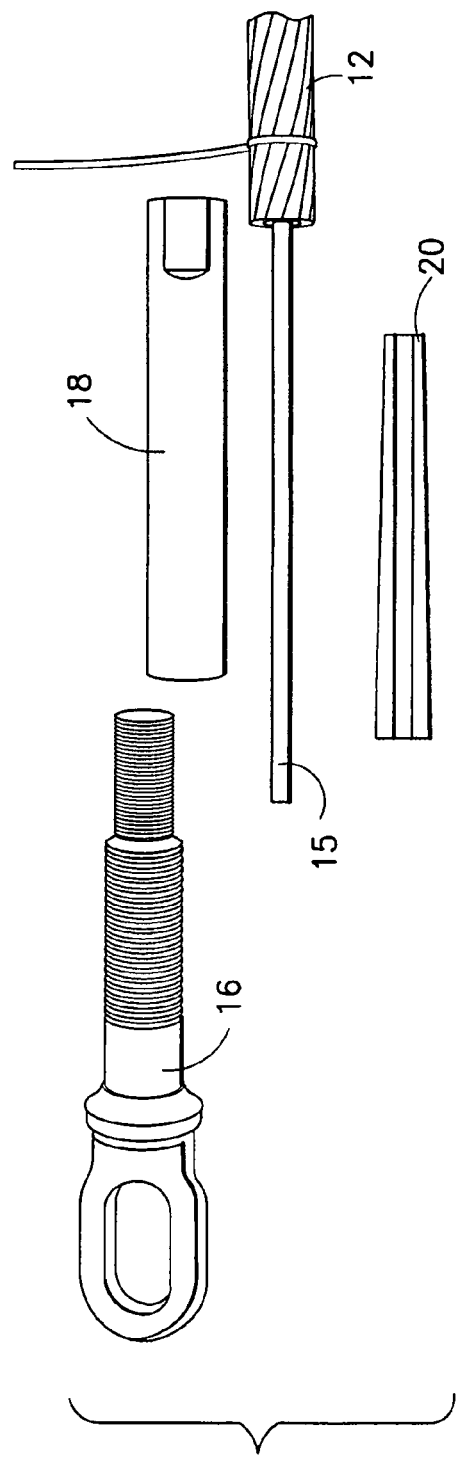
FIG. 9 is a preassembly view of the members shown in FIG. 8 and the other members of the connector shown in FIGS. 2 and 3.

FIG. 9 shows the connector member 16, wedges 20, and collet housing (or wedge sleeve) 18 ready for installation onto the exposed core 15. As seen in FIGS. 10 and 11, the collet housing 18 is located over the exposed end of the core 15 and the wedges 20 are inserted into the collet housing 18 with the exposed core 15 being located between the wedges 20. In the preferred method, a gap 70 is provided between the rear end 72 of the collet housing 18 and the front end of the wires 19. When the wedges 20 are inserted between the collet housing 18 and the core 15, a small portion of the core 15 extends past the front end of the wedges, such as about ¼ inch for example.

Figure 12:
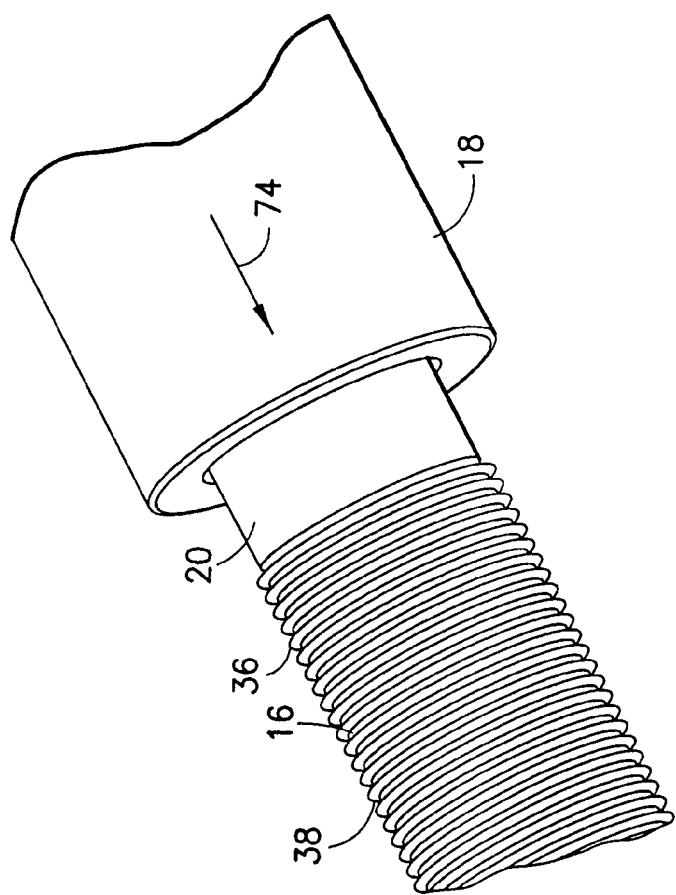
FIG. 12 is a perspective view of the dead end connector member being located against the ends of the wedges shown in FIG. 11.
Figure 13:
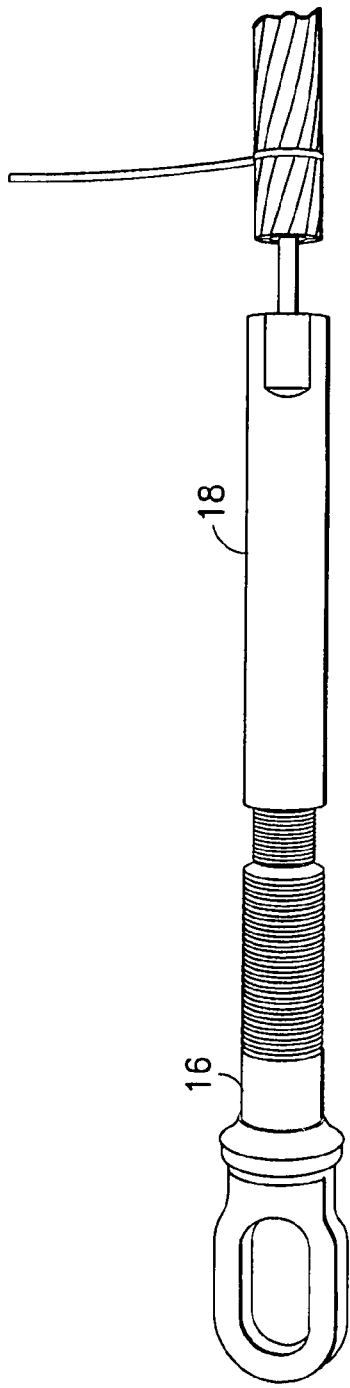
FIG. 13 is a perspective view of the dead end connector member being screwed into the collet housing shown in FIG. 12.

As seen in FIG. 12, the dead end connector member 16 is positioned on the end of the exposed core 15 with the second end 36 located against the front end of the wedges 20. The collet housing 18 is then pulled or slid towards the dead end connector member 16 as illustrated by arrow 74. This helps to push the wedges 20 inside the collet housing 18 and readies the assembly for threading of the collet housing 18 to the threaded section 38 of the dead end connector member 16. As seen in FIG. 13, the dead end connector member 16 can be screwed together with the collet housing 18. A tool can be placed inside the eyelet 34 and a wrench can be attached to the flat sections 76 (see FIG. 10) of the collet housing to rotate the two members 16, 18 relative to each other. This tightens the dead end connector member 16 to the collet housing 18 to set the wedges 20. In a preferred embodiment, the dead end connector member will bottom out at a predetermined distance of the threaded section 38, such as about 1 inch for example.

As seen in FIG. 14, with the collet housing 18 threaded onto the dead end connector member 16, the wedges 20 extend slightly past the rear end of the collet housing 18. The gap 70 provides a space for the ends of the wedges 20 to move into without encountering interference from the wires 19. The gap 70 also provides a space for aluminum sleeve compression/expansion of the wires 19 during crimping of the outer sleeve 22 and inner sleeve 52 to the wires. Referring to FIG. 15, the cable tie can be cut away from the wires 19. The outer sleeve 22 and inner sleeve 52 can be slid forward with the outer sleeve 22 stopping against a butt stop on the dead end connector member 16 and the inner sleeve 52 stopping against a stop in the outer sleeve. This places the knurl zones 54, 58 in a desired location for contact with the inner surface 23 of the outer sleeve 22. Referring also to FIG. 1, the front end 78 of the outer sleeve 22 can be crimped onto the dead end connector member 16. The rear end 80 of the outer sleeve 22 can be crimped with the inner sleeve 52 onto the wires 19 of the cable 12. This completes assembly of the electrical connector 14 with the cable 12. The outer sleeve 22 provides an electrical connection of the wires 19 to another member. The connector member 16, collet housing 18 and wedges 20 provide a mechanical connection of the core 15 to another member.

Although the figures and discussion have been with respect to a dead end connector, it should be understood that the disclosed knurled inner sleeve 52 may be provided for use in other suitable type of connector. For example, the disclosed inner sleeve 52 may be used with a splice electrical connector as described below.

Figure 16:
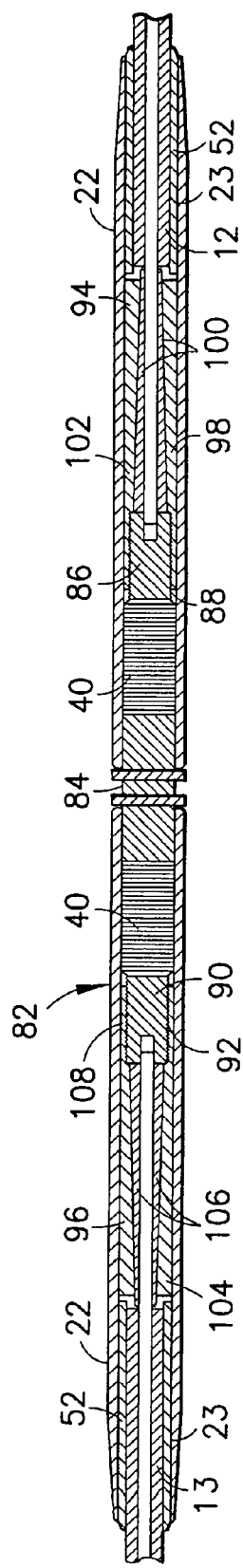
FIG. 16 is a cross sectional view of an electrical splice connector incorporating features of the invention.

Referring now to FIG. 16, a cross sectional view of a splice electrical connector 82 for connecting two of the cables 12, 13 to each other is shown. The electrical connector 82 generally comprises a middle connector member 84 having a first end 86 with a first threaded section 88 and an opposite second end 90 with a second threaded section 92. The electrical connector 82 also comprises a first section 94 and a second section 96.

The first section 94 generally comprises a first collet housing 98 and a first set of wedges 100. The first collet housing (or first wedge sleeve) 98 has a general tube shape. The first collet housing 98 comprises a first end 102 with a threaded section adapted to be threaded onto the first threaded section 88 of the middle connector member 84. The first wedges 100 are adapted to be inserted directly between the first collet housing 98 and a core member of a first cable conductor 12. The first end 86 of the middle connector member 84 is adapted to push the first wedges 100 into the first collet housing 98 as the middle connector member and the first collet housing are threaded with each other.

The second section 96 generally comprises a second collet housing 104 and a second set of wedges 106. The second collet housing (or second wedge sleeve) 104 has a general tube shape. The second collet housing 104 comprises a first end 108 with a threaded section adapted to be threaded onto the second threaded section 92 of the middle connector member 84. The second wedges 106 are adapted to be inserted directly between the second collet housing 104 and a core member of a second cable conductor 13. The second end 90 of the middle connector member is adapted to push the second wedges 106 into the second collet housing 104 as the middle connector member and the second collet housing are threaded with each other. The second collet housing 104 and the second set of wedges 106 are identical to the first collet housing 98 and the first set of wedges 100. However, in alternate embodiments they could be different.

Figure 4:
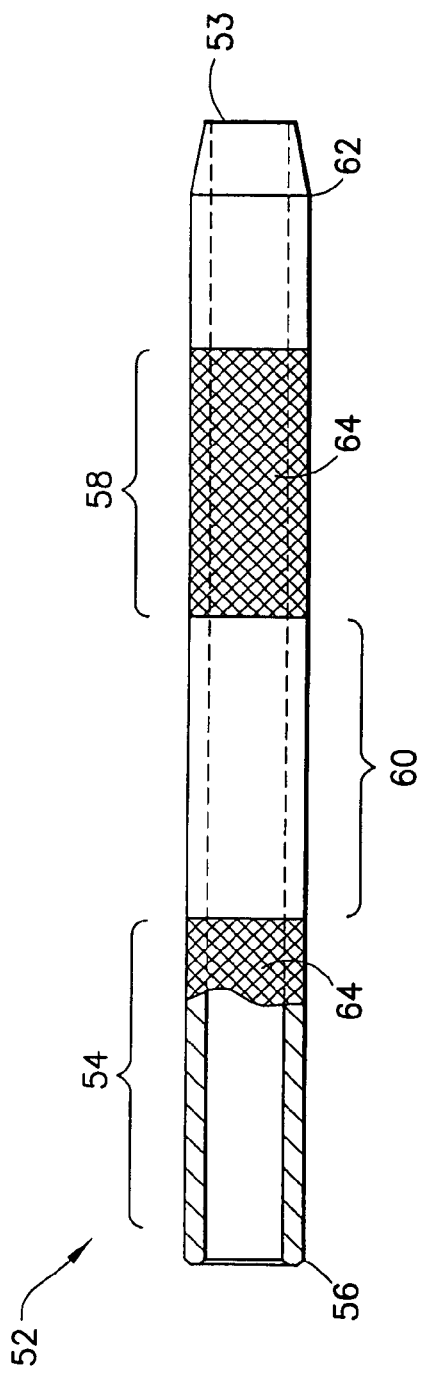
FIG. 4 is an enlarged cross section view of the inner sleeve shown in FIG. 3.
Figure 5:
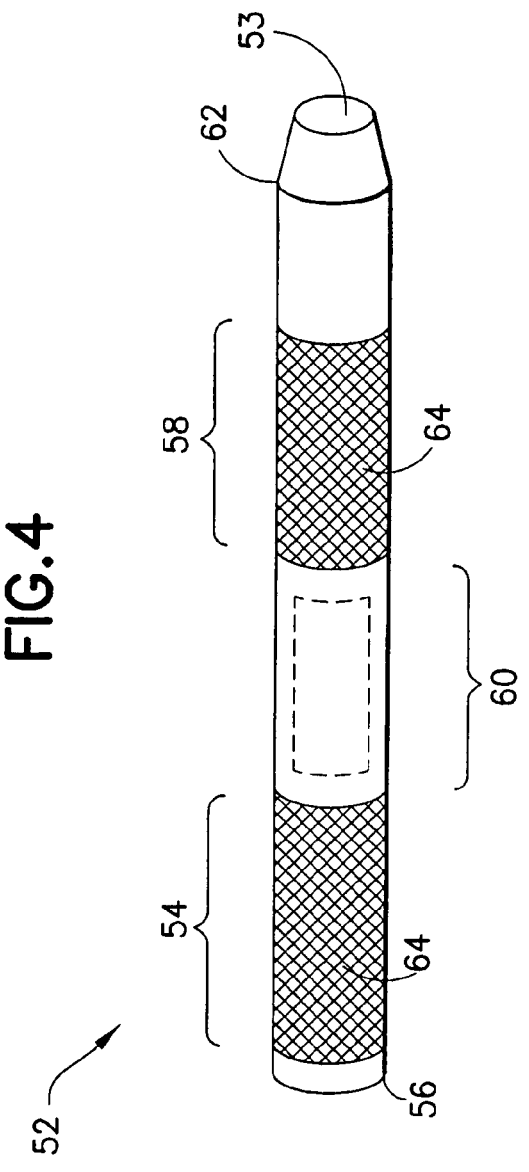
FIG. 5 is a perspective view of the inner sleeve shown in FIG. 3.

As shown in FIG. 16, each section 94, 96 also comprises an inner sleeve 52. As illustrated in FIGS. 4 and 5, the inner sleeve 52 comprises a first knurl area or zone 54 proximate a first end 56 of the inner sleeve 52. The inner sleeve 52 also comprises a second knurl zone 58 between a middle portion 60 of the inner sleeve 52 and a second end 62 of the inner sleeve 52. The splice connector 82 also comprises two outer sleeves 22; one at each of the sections 94, 96. The knurl zones 54, 58 provide for defined areas of contact between the outer surface of the inner sleeve 52 and the inner surface 23 of the outer sleeve 22. The inner sleeves 52 disposed within the splice electrical connector 82 provide the same advantages of reduced electrical contact resistance and improved efficiency as described above for the dead end connector 14. Assembly of the splice connector 82 with the two cables 12, 13 and the two inner sleeves 52 is the same as noted above with reference to the dead end connector. The outer sleeves 22 are crimped onto the ridge sections 40 of the middle connector member 84, and crimped onto the wires of the cables at the inner sleeves 52. Thus, the two cables are mechanically connected to each other for high tension by the members 84, 98, 100, 104 and 106, and electrically connected to each other by the outer sleeves 22, inner sleeves 52 and middle member 84 which could be aluminum. In an alternate embodiment, a single outer sleeve could be provided for both sections 94, 96.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An electrical connector assembly comprising:
   a connector member having a first end section and a second end section;
   a wedge proximate the second end section of the connector member;
   a wedge sleeve having a general tube shape, wherein the wedge is configured to be between the wedge sleeve and a core member of a cable;
   an outer sleeve located around the wedge sleeve, wherein the outer sleeve is attached onto the connector member; and
   an inner sleeve configured to be fitted between the outer sleeve and the cable, wherein an outer surface of the inner sleeve comprises a first knurled area.

2. The electrical connector assembly of claim 1 wherein the inner sleeve comprises a second knurled area spaced from the first knurled area.

3. The electrical connector assembly of claim 1 wherein the inner sleeve comprises a tubular shape sized and shaped to accommodate the cable therein.

4. The electrical connector assembly of claim 1 wherein the first knurled area is in contact with an inner surface of the outer sleeve.

5. The electrical connector assembly of claim 1 wherein the first knurled area forms a substantially water tight seal between the inner sleeve and the outer sleeve.

6. The electrical connector assembly of claim 1 wherein the first knurled area is configured to displace surface oxides, inhibitors, and/or protective coatings between the inner sleeve and the outer sleeve.

7. The electrical connector assembly of claim 1 wherein the inner sleeve comprises a one-piece member made of electrically conductive material.

8. The electrical connector assembly of claim 1 wherein the first knurled area forms a textured surface, and wherein an inner surface of the outer sleeve comprises a smoother surface than the textured surface of the inner sleeve.

9. The electrical connector assembly of claim 1 wherein the inner sleeve comprises a second knurled area spaced from the first knurled area, and wherein the inner sleeve comprises a tubular shape sized and shaped to accommodate the cable therein.

10. The electrical connector assembly of claim 9 wherein the first knurled area is in contact with an inner surface of the outer sleeve.

11. The electrical connector assembly of claim 10 wherein the first knurled area provides an electrical contact surface between the inner sleeve and the outer sleeve.

12. A dead end electrical connector assembly comprising:
    a dead end connector member having a first end section, wherein the first end section is adapted to be connected to another member;
    an outer sleeve connected to the dead end connector member;
    a wedge sleeve inside the outer sleeve; and
    an inner sleeve proximate an end of the outer sleeve, wherein the inner sleeve comprises raised ridges on an outer surface of the inner sleeve, and wherein the raised ridges are in contact with an inner surface of the outer sleeve.

13. The dead end electrical connector assembly of claim 12 wherein the raised ridges provide an interference fit between the inner sleeve and the outer sleeve.

14. The dead end electrical connector assembly of claim 12 wherein the raised ridges form a knurled area.

15. The dead end electrical connector assembly of claim 12 wherein the inner sleeve comprises a one-piece member made of electrically conductive material.

16. The dead end electrical connector assembly of claim 12 wherein the inner sleeve further comprises a first end and a middle portion, and wherein the raised ridges are between the first end and the middle portion.

17. The dead end electrical connector assembly of claim 12 wherein the inner sleeve comprises a tubular shape sized and shaped to accommodate a cable therein.

18. The dead end electrical connector assembly of claim 12 wherein the inner sleeve further comprises indentations between the raised ridges.

19. A splice electrical connector assembly comprising:
    a middle connector member having a first end and an opposite second end;
    a first section comprising a first wedge sleeve and a first wedge, wherein the first wedge sleeve comprises a general tube shape and a first end proximate the first end of the middle connector member, and wherein the first wedge is configured to be disposed between the first wedge sleeve and a core member of a first cable;
    a second section comprising a second wedge sleeve and a second wedge, wherein the second section is connected to the opposite second end of the middle connector member;
    an outer sleeve located around the first wedge sleeve, wherein the outer sleeve is connected to the middle connector member; and
    an inner sleeve configured to be fitted between the outer sleeve and the first cable, wherein an outer surface of the inner sleeve comprises a first knurled area.

20. The splice electrical connector assembly of claim 19 wherein the at least one inner sleeve further comprises a first end, a second end, and a second knurled area, wherein the first knurled area is proximate the first end, and wherein the second knurled area is proximate the second end.

21. The splice electrical connector assembly of claim 19 wherein the first knurled area may comprise straight lines or diagonal cross-hatch indentations.

22. The splice electrical connector assembly of claim 19 wherein the at least one inner sleeve comprises a one-piece member made of electrically conductive material.

23. The splice electrical connector assembly of claim 19 wherein the first knurled area is in contact with an inner surface of the at least one outer sleeve.

24. The splice electrical connector assembly of claim 19 wherein the first knurled area forms a substantially water tight seal between the at least one inner sleeve and the at least one outer sleeve.

25. The splice electrical connector assembly of claim 19 wherein the first knurled area is configured to displace surface oxides, inhibitors, and/or protective coatings between the at least one inner sleeve and the at least one outer sleeve.

* * * * *